United States Patent [19]

Connor et al.

[11] 3,752,913

[45] Aug. 14, 1973

[54] CONDITIONAL REPLENISHMENT VIDEO ENCODER WITH LOW-FREQUENCY COMPENSATION

[75] Inventors: Denis John Connor; John Ormond Limb, both of New Shrewsbury; Kenneth Allen Walsh, Matawan, all of N.J.

[73] Assignee: Bell Telephone Laboratories, Incorporated, Murray Hill, N.J.

[22] Filed: June 14, 1972

[21] Appl. No.: 262,678

[52] U.S. Cl............... 178/6, 178/DIG. 3, 179/15.55, 325/38 B

[51] Int. Cl................................................ H04n 7/12

[58] Field of Search.................... 178/DIG. 3, 6, 7.1; 179/15 BW, 15.55 R; 325/38 B, 38 R

[56] References Cited

UNITED STATES PATENTS 3,533,361 1/1971 Mounts.................................. 178/6

*Primary Examiner*—Robert L. Griffin
*Assistant Examiner*—Joseph A. Orsino, Jr.
*Attorney*—W. L. Keefauver et al.

[57] ABSTRACT

Video signal samples for all of the picture elements in a frame interval are stored in a frame memory and each new video signal sample is compared with its corresponding sample from the frame memory in order to develop a frame-to-frame difference signal. A movement detector utilizes the frame-to-frame difference signals to determine when a new video signal sample should be utilized to update the old sample stored in the frame memory and be transmitted to the receiving location. An address word accompanies the transmitted video signal amplitude in order to indicate to the receiver the location of the amplitude within the frame interval. Frame-to-frame differences not indicated as belonging to a moving area are integrated for an entire video line interval. If the integration result exceeds a predetermined threshold, indication of this fact is transmitted to the receiver during the horizontal blanking interval. In addition, a compensation value is developed in response to this indication, and this value is utilized during the next video line interval to modify all of the picture element amplitudes stored in the frame memory for that video line interval. As a result, stored picture element amplitudes are changed en masse for an entire line interval in response to low-frequency changes of the type which occur as a result of changes in light intensity.

15 Claims, 5 Drawing Figures

Patented Aug. 14, 1973 3,752,913

3 Sheets-Sheet 1

SPECIAL ADDER CHARACTERISTICS

| $I_1$ | $I_2$ | OUT |
|---|---|---|
| −1 | −1 | −1 |
| −1 | +0 | −1 |
| −1 | +1 | +0 |
| +0 | −1 | −1 |
| +0 | +0 | +0 |
| +0 | +1 | +1 |
| +1 | −1 | +0 |
| +1 | +0 | +1 |
| +1 | +1 | +1 |

CONDITIONAL REPLENISHMENT VIDEO ENCODER WITH LOW-FREQUENCY COMPENSATION

BACKGROUND OF THE INVENTION

This invention relates to redundancy reduction systems and, more particularly, to redundancy reduction systems known to those skilled in the art as conditional replenishment video systems.

In U.S. Pat. No. 3,571,505 to F. W. Mounts, issued on Mar. 16, 1971, a redundancy reduction system is described in which the amplitude values for the picture elements of an entire video frame interval are stored in a frame memory in both the transmitting and receiving locations. These video signal amplitudes are utilized in the receiver to develop a continuous video signal. Each new video signal amplitude in the transmitting location is compared with its corresponding amlitude stored in the transmitting frame memory. Except for synchronization, information is transmitted to the receiving location only under the condition that a significant difference is found to exist between the new amplitude and the previously stored amplitude. If a significant difference is found to exist, the stored video signal amplitude is replenished with a new amplitude value in both the transmitting and receiving locations. Indicative of their operation, these systems have been designated by those skilled in the art as conditional replenishment video systems.

In the above-mentioned Mounts patent, each new video signal amplitude is subtracted from the previously stored amplitude and the resulting frame-to-frame difference is compared against a threshold level in order to determine whether information should be transmitted to the receiving location. Generally, significant frame-to-frame differences are caused by movement of objects in the field of view. Hence, the apparatus utilized to determine whether or not information should be transmitted is designated as a movement detector. In a copending application of D. J. Connor, J. O. Limb, R. F. W. Pease and W. G. Scholes, Ser. No. 192,283, filed Oct. 26, 1971 now U.S. Pat. 3,716,667 and entitled "Apparatus for Detecting the Moving Areas in a Video Signal," a much more sophisticated movement detector is described in which the frame-to-frame differences for an area of picture elements are utilized to determine whether information should be transmitted to the receiving location. In this more sophisticated movement detector, individual spikes of noise causing significant frame-to-frame differences are not permitted to cause the transmission of information to the receiving locations. Because of the integration effect of this type movement detector, the picture is essentially segmented into moving and stationary areas and, therefore, this more sophisticated movement detector has been designated by those skilled in the art as a segmenter. For both types of movement detectors, however, the determination as to whether or not amplitudes should be replenished is still based on frame-to-frame differences between corresponding picture element amplitudes in the video frame interval.

In video-telephone systems the camera does not operate under studio-type conditions. Accordingly, changes in light intensity due to the shadows of moving objects other than those being viewed, or due to a billowing curtain or shade, are entirely possible. These changes in light intensity will result in a change in the video signal level and they are low enough in frequency such that the amplitude change which occurs during a line interval at the beginning of the change may not be large enough to produce an indication of movement during that line interval in either one of the above-mentioned movement detectors. The change in video signal level over several line intervals, however, can result in the selection of an extremely large number of picture elements for transmission to the receiving location. This type of change can produce an excessive overloading of the buffer memory utilized in a conditional replenishment video system for the purpose of interfacing the data which is produced at a random rate with the constant digital bit rate of a long haul transmission system. Nevertheless, in the interest of producing an accurate portrayal of the scene being viewed, it would be desirable to transmit these light intensity changes.

The station sets in a video-telephone system are not expected to be connected directly to a conditional replenishment video system. These redundancy reduction systems are expected to be utilized only when a video signal is to be transmitted over a long distance. Hence, these systems are expected to be shared with a large number of video-telephone station sets. As a result, each station set may be connected through one or more repeaters before its signal is delivered to a conditional replenishment video encoder. Variations in the gain of any one or more of these repeaters will also cause a change in the video signal level being coupled to the input of the conditional replenishment video encoder. Although these changes in video signal level are not from the scene being viewed, they may nevertheless result in the selection of a large number of picture elements for transmission by the movement detector. It would be preferable in most cases to transmit these video signal level changes rather than suffer the picture degradations introduced as a result of an excessively overloaded buffer memory.

SUMMARY OF THE INVENTION

A primary object of the present invention is to transmit the above-mentioned video signal level changes in a conditional replenishment type video system without causing overloading of the buffer memory.

Another object of the present invention is to transmit these video signal level changes without an excessive modification in the normal operation of a conditional replenishment video system.

These objects and others are achieved in accordance with the present invention, wherein the frame-to-frame differences developed between the new video signal amplitudes and the previously stored amplitudes are gated in response to the output of the movement detector. Only those frame-to-frame differences that occur during the intervals that are deemed to be nonmoving are coupled through the gate to a low-frequency compensation apparatus. This apparatus develops a correction value in response to these frame-to-frame differences and this correction value is utilized to modify the amplitudes of the picture elements stored in the frame memory before the picture elements are compared with their corresponding new video signal amplitudes.

In the specific embodiment to be described hereinafter, the nonmoving frame-to-frame differences for an entire line interval are summed in an integrator and the result is checked against a threshold level in order to determine whether the picture element amplitudes have, on the average, increased, decreased or remained the same from the video frame interval to the next. A two-bit code word is developed to indicate that the compensation value used during a given video line should be increased, decreased or remain the same in correcting the picture elements of the next video line interval. This two-bit code word is also transmitted to the receiving location in order to permit the receiver to perform a similar modification of its compensation value.

In accordance with a feature of the present invention, a history of changes for a given video line during the previous frame intervals is also permitted to influence the determination as to whether the compensation value for that video line should be increased, decreased, or remain unaltered. Hence, both the previous line in a given frame interval and the same line in a previous frame interval are utilized to determine the type of modification that should be made to the picture element amplitudes in a given line interval. In this way, light intensity changes that affect one portion of the scene being viewed more than another portion can be accommodated by the low-frequency compensation apparatus.

BRIEF DESCRIPTION OF THE DRAWING

The invention will be more readily understood after reading the following detailed description in conjunction with the drawing, in which.

DETAILED DESCRIPTION

Figure 1:
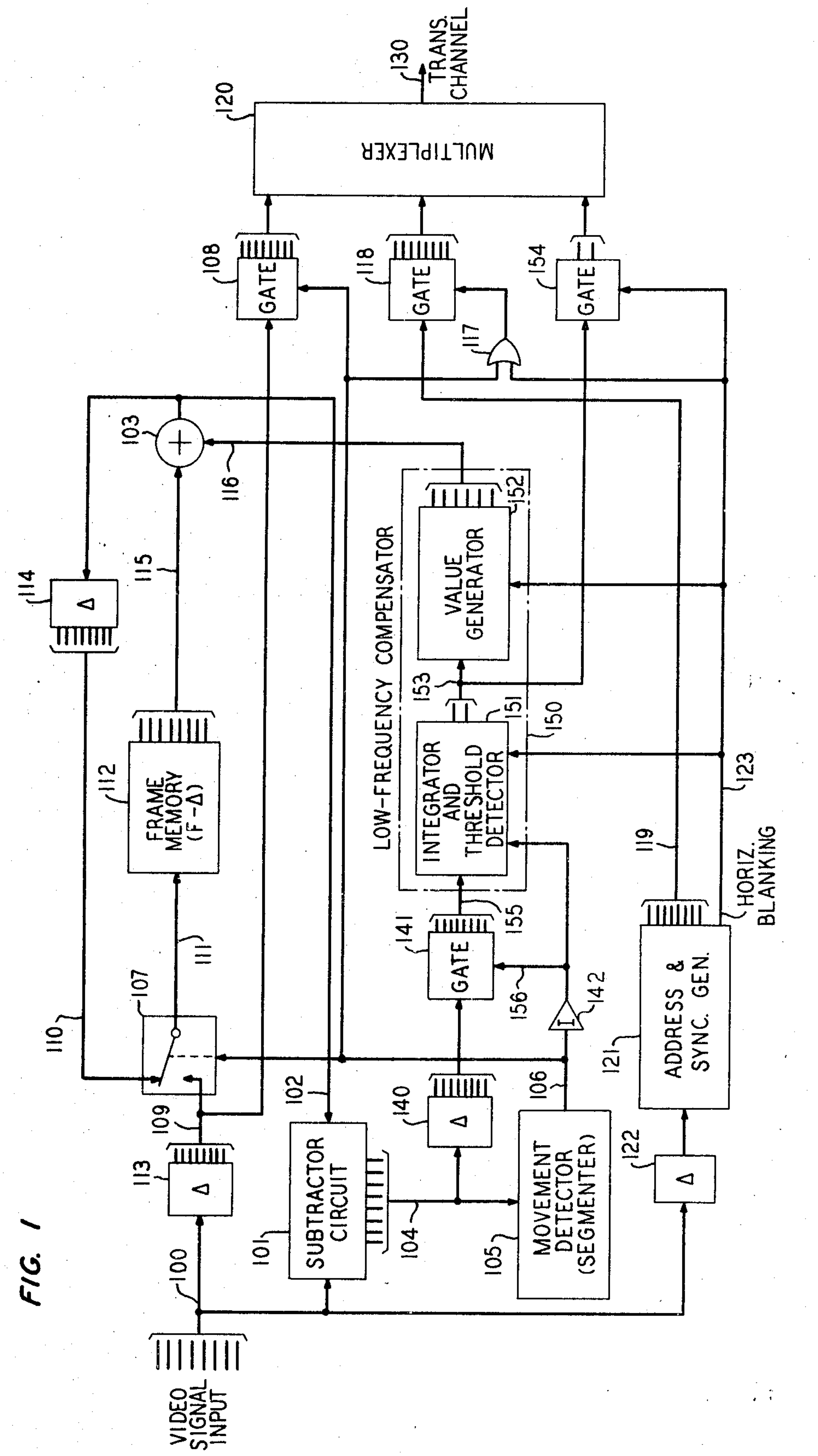
FIG. 1 is a schematic block diagram of a conditional replenishment encoder constructed in accordance with the present invention.

In FIG. 1, digital words, the values of which represent the video amplitudes for the picture elements throughout a video frame interval, are coupled by way of bus 100 to the input of a subtractor circuit 101. Bus 100, like all other lines in the figures designated hereinafter as a "bus", is actually constructed of a plurality of transmission paths, one for each of the digital bits said to be present in the digital word carried on the bus. In the present embodiment, an eight-bit digital word is provided to represent the amplitude of each picture element present on bus 100. A second input of subtractor circuit 101 is connected by way of bus 102 to the output of an adder circuit 103. As will be apparent hereinafter, the digital word present on bus 102 represents the amplitude for the same spatial point within the video frame as the digital word present on bus 100. Accordingly, the output of subtractor circuit 101 provides on bus 104 the frame-to-frame differences for all picture elements within the video frame interval.

Each frame-to-frame difference is coupled by way of bus 104 to the input of a movement detector 105. As indicated hereinabove, movement detector 105 may be constructed of a simple threshold circuit which provides an energizing signal at its output when the frame-to-frame difference exceeds a predetermined threshold. In addition, movement detector 105 may be constructed as a segmenter of the type described in the above-identified copending application of D. J. Connor et al. If movement detector 105 is constructed as a segmenter, the decision as to whether any given frame-to-frame difference is to be deemed significant is based on an entire area of picture elements rather than on a single picture element. If this area of picture elements includes picture elements that both precede and follow the picture element present on bus 100, a delay is inherent in the operation of movement detector 105 between the time that a picture element on bus 100 provides a frame-to-frame difference on bus 104 and the time that a corresponding energizing signal is developed at the output of movement detector 105 on line 106. As will be described hereinafter, this inherent delay of movement detector 105 is compensated by delay circuits 113, 114, 122 and 140.

The energizing signal produced by either type of movement detector is utilized by the remainder of the apparatus as an indication that the picture element amplitude represented by the digital word on bus 100 should be transmitted to the receiving location and, in addition, should be utilized to replenish the previously stored amplitude corresponding to that picture element. To accomplish this end, the energizing signal on line 106 is coupled to the control input of a selective transmission gate 107 and to the control input of a transmission gate 108.

Transmission gate 107 is shown symbolically as a single-pole double-throw switch but is actually constructed of a plurality of AND and OR gates such that either the digital word present on bus 109 or the digital word present on bus 110 may be coupled through to the output of gate 107. With an energizing signal on bus 106 at the control input of gate 107, the digital word on bus 109 is coupled through gate 107 by way of bus 111 to the input of a frame memory 112. The digital word on bus 109 is identical to the digital word on bus 100 after it has been delayed by delay circuit 113. Delay circuit 113 is constructed to have a delay identical to the above-mentioned inherent delay within movement detector 105. Hence, when the digital word on bus 100 reaches the input of transmission gate 107 by way of bus 109, the presence of an energizing signal on line 106 corresponding to an indication by movement detector 105 that this digital word belongs to a moving area causes the digital word on bus 109 to be coupled to the input of frame memory 112.

Each digital word coupled to the input of frame memory 112 is coupled after approximately one frame interval to the input of adder circuit 103. The output of adder circuit 103 is coupled through a delay circuit 114 to the bus 110 input of transmission gate 107. If the digital word present on bus 116 at the second input of adder circuit 103 has a value of zero and if no energizing signal appears on line 106, the digital words present in frame memory 112 are recirculated by way of adder circuit 103, delay circuit 114 and transmission gate 107. Frame memory 112 may be constructed of an ultrasonic delay line for each of the bits present in the digital word said to be carried on buses 111 and 115. Memory 112 is constructed to have a delay less than one frame interval by an amount equal to the delay provided in delay circuit 114, which in turn has a delay equal to that provided by delay circuit 113. Accordingly, each digital word presented on bus 111 at the input of frame memory 112 reappears exactly one video frame interval later on bus 110 and is modified in amplitude by the digital word present on bus 116 at the second input of adder circuit 103. In this way, digital words representing the video signal amplitudes for all of the picture elements within a frame interval are recirculated within frame memory 112 providing the digital word on bus 116 has a value of zero, and a picture element amplitude is replenished by a new amplitude only when an energizing signal is provided on line 106.

Line 106 is also coupled to the control input of transmission gate 108. With its control input energized, gate 108 couples the digital word present on bus 109 to one input of a multiplexer 120. Line 106 is also coupled to one input of an OR gate 117. Hence, any energizing signal present on line 106 is coupled through OR gate 117 to the control input of a transmission gate 118. In response to an energizing signal at its input, transmission gate 118 couples an address word present on bus 119 at the output of an address and sync generator 121 through to a second input of muliplexer 120. As in the case of the system described in the above-identified Mounts patent, address and sync generator 121 responds to the video synchronization information present in the digital words on bus 100 after they have been delayed in a circuit 122 in order to produce address words on bus 119 which indicate the video line location of each of the digital words present on bus 109.

As in the above-identified Mounts patent, address and sync generator 121 includes a counter which responds to the presence of each new digital word from the output of delay circuit 122 by increasing the value of the address word on bus 119 by a value of one. During each horizontal blanking interval the counter within address and sync generator 121 is reset to zero and an energizing pulse is produced on line 123 to indicate that the horizontal blanking interval has occurred. This energizing pulse on line 123 is coupled to a second input of OR gate 117. Accordingly, each time that the horizontal blanking interval occurs, an address word from address generator 121 is coupled by way of bus 119 through gate 118 to the above-mentioned second input of muliplexer 120. This digital word on bus 119 which occurs during the horizontal blanking interval is caused to have digital bit values which when they appear in a digital bit sequence may be distinguished from each and every other similar-length digital bit sequence in the train of digital bits transmitted to the receiving location. When the receiver detects this distinguishable digital word, it recognizes that a horizontal blanking interval has occurred in the transmitting encoder and, therefore, the picture elements to follow belong to a different video line than those which preceded the distinguishable word. As a result, the address word produced on bus 119 need only indicate the position of a picture element within a video line since the transmitting encoder and the receiving decoder are line synchronized. The present invention, however, is in no way related to the method of addressing transmitted picture element amplitudes, and the address word accompanying each of the transmitted amplitude words may, at the expense of additional bits, indicate the position of an amplitude word within the video frame interval.

Multiplexer 120, in a manner well known to those skilled in the digital transmission art, takes the digital bits presented to its inputs and couples these bits in a predetermined sequence to a transmission channel 130. Generally, it is desirable to operate this transmission channel at a constant bit rate and, therefore, multiplexer 120 utilizes a buffer memory, as in the case of the above-identified Mounts patent, to store the input digital bits before they are coupled to transmission channel 130.

The apparatus described thus far, with the exception of adder circuit 103, is identical in its operation to the conditional replenishment video system described in the above-identified Mounts patent. This operation is identical even with the addition of adder circuit 103, providing the digital word on bus 116 has a value of zero. Delay circuits 113, 114 and 122 have been added solely to accommodate the delay inherent in a segmenter of the type described in the above-identified copending application of D. J. Connor et al. These delay circuits have in no way altered the basic operation of the conditional replenishment video system.

In the type of system described thus far low-frequency changes of the sort produced by a change in light intensity could continue over a period of several line intervals to the point where the frame-to-frame differences produced by these changes would result in the production of an energizing signal on line 106 for all of the affected picture elements. If a light intensity change occurs uniformly throughout the entire scene being viewed, all of the picture elements could produce energizing signals on line 106 during the same video frame interval. This, of course, would result in an excessive overloading of either the buffer memory within muliplexer 120 or the bit rate of transmission channel 130. To minimize the detrimental effect that these type low-frequency level changes have on a conditional replenishment system, the remainder of the apparatus shown in FIG. 1 operates in combination with adder circuit 103 to update en masse the video signal amplitudes for an entire video line. In addition, an indication is provided to the receiving location that the picture elements in its frame memory should be similary updated.

Each frame-to-frame difference signal on bus 104 is coupled through a delay circuit 140 to the input of a transmission gate 141. Delay circuit 140, like circuit 113 described hereinabove, has a delay equal to the delay inherent in the operation of the movement detector 105. Line 106 is connected by way of an inverter 142 to the control input of transmission gate 141. When an energizing signal is present on line 106, gate 141 is inhibited from coupling the digital word at the output of circuit 140 through to the input of a low-frequency compensator 150. If, however, an energizing signal is not present on line 106, the control input of gate 141 is energized, and the digital word from circuit 140 is coupled through gate 141 to the input of the low-frequency compensator 150. As a result, the frame-to-frame differences which are not deemed by the movement detector to belong to a moving area are coupled through gate 141 to the input of the low-frequency compensator 150. Low-frequency compensator 150 utilizes these frame-to-frame differences, in a manner to be described hereinafter, to develop a digital word on bus 116 during each of the horizontal blanking intervals. This word remains on bus 116 during the entire following video line interval, thereby causing each of the digital words on bus 115 at the output of frame memory 112 to be modified by the amplitude of the digital word on bus 116 before that word is coupled by way of bus 102 to the second input of subtractor circuit 101.

As an alternative to the present embodiment, the digital word developed on bus 116 could be transmitted through to the receiving decoder by coupling this digital word to the multiplexer 120 during the horizontal blanking interval along with the distinguishable address word developed on bus 119. The receiving decoder could then utilize this digital word from bus 116 to compensate the equivalent picture elements in its frame memory.

In a video-telephone system where the video signals are encoded into 256 levels and, furthermore, where the movement detector or segmenter is caused to respond to frame-to-frame differences of a magnitude equal to at least four levels, the low-frequency compensator 150 can be constructed to respond to an average frame-to-frame difference for picture elements in the nonmoving segment of a video line of less than four levels. As indicated hereinabove, some low-frequency level changes produce frame-to-frame differences of less than four levels during a given line interval, but over several line invervals these level changes may result in frame-to-frame differences of a considerable magnitude. Accordingly, the digital word on bus 116 may become quite large in magnitude and therefore require a large number of bits in the digital word present on bus 116. In order to decrease the number of bits that are required for transmission to the receiving location, the low-frequency compensator 150 in the present embodiment develops a two-bit digital word on bus 153 which is transmitted to the receiving decoder wherein this two-bit digital word is utilized to indicate whether compensation should be increased, decreased, or remain unaltered from the value which was used during the previous video line interval.

Figure 2:
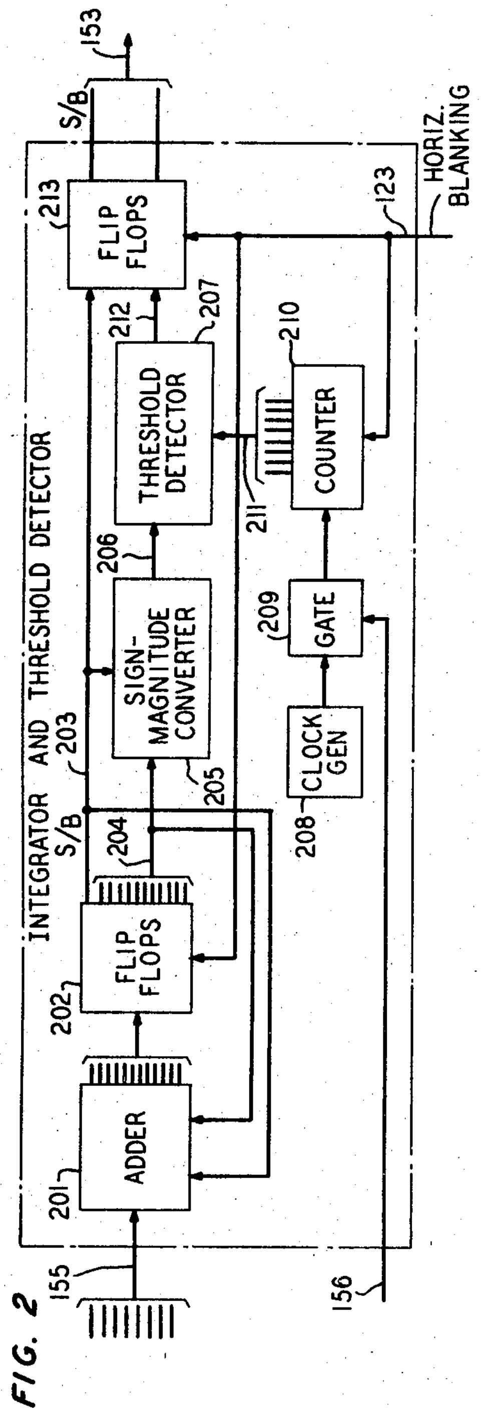
FIGS. 2 and 3 are schematic block diagrams of apparatus shown as blocks within FIG. 1.

In the present embodiment, each digital word present at the output of gate 141, representing the frame-to-frame difference for a nonmoving picture element, is coupled by way of bus 155 to the input of an integrator and threshold detector 151. A detailed schematic block diagram of integrator and threshold detector 151 is shown in FIG. 2. In FIG. 2, the frame-to-frame difference word on bus 155 is coupled to one input of an adder circuit 201. The output of adder circuit 201 is connected to a group of flip-flops 202, the outputs of which are connected back to a second input of adder circuit 201. This feedback arrangement of adder circuit 201 and flip-flops 202 provides an integrator circuit, with the output of the flip-flops 202 providing an algebraic sum of the digital words present on bus 155 for an entire video line interval. During each horizontal blanking interval, the energizing pulse on line 123 resets flip-flops 202 to zero.

Adder circuit 201 and flip-flop 202 are constructed to operate with 2's complement form of digital logic. The output of flip-flops 202 is separated, as shown in FIG. 2, with the sign bit present on line 203 and the remaining bits present on bus 204. A sign magnitude converter 205 responds to both the sign bit on line 203 and the remaining bits on bus 204 in order to provide a digital word on bus 206, the magnitude of which indicates the integration result after an entire video line interval. This magnitude word on bus 206 is connected to one input of a threshold detector 207. A second input of threshold detector 207 is provided with a digital word the magnitude of which indicates the number of nonmoving picture elements in the video line under consideration. The threshold established within detector 207 is linearly related to the magnitude of the digital word provided at its second input. In a video-telephone system wherein the video signal has been encoded into 256 levels and the movement detector responds to frame-to-frame differences of four levels or greater, threshold detector 207 can be constructed to provide an output when the average frame-to-frame difference for the nonmoving picture element is equal to a value of at least one level.

A clock generator 208 provides energizing pulses at its output at a rate equal to that of the picture elements within a video line. In the present arrangement, clock generator 208 appears as a separate entity but, as will be apparent to those skilled in the art, these energizing pulses may also be provided from the address and sync generator 121. Each energizing pulse out of clock generator 208 is coupled to the input of a gate circuit 209, the control input of which is connected by way of line 156 to the output of inverter 142. As a result, gate 207 couples only each energizing pulse from generator 208 that is present during a nonmoving picture element. The energizing pulses present at the output of gate 209 are coupled to the input of a counter 210. Each energizing pulse causes the digital word present at the output of counter 210 on bus 211 to advance by a value of one. Accordingly, counter 210 provides a digital word on bus 211 the value of which indicates the number of nonmoving picture elements in the video line under consideration. Counter 210 is reset to zero during each horizontal blanking interval by the energizing pulse on line 123.

If, as in the present embodiment, a threshold level of one out of 256 levels is to be utilized by threshold detector 207, the digital word on bus 211 may be directly compared to the digital word on bus 206. If the digital word on bus 206 is less than the output of counter 210, threshold detector 207 provides a logical "0" on line 212. If, on the other hand, the digital word on bus 206 is greater than the output of counter 210, threshold detector 207 provides a logical "1" on line 212. Threshold levels greater than one out of 256 levels may also be utilized by simply multiplying the output of counter 210 by the appropriate factor.

The sign bit on line 203 and the logical state present on line 212 are stored in flip-flops 213. These flip-flops are also clocked during each horizontal blanking interval by the energizing pulse on line 123. Their operation is sufficiently delayed, however, such that their developed output at the termination of a video line is coupled by way of bus 153 through gate 154 in FIG. 1 to an input of multiplexer 120 simultaneously with the distinguishable address word on bus 119. This two-bit digital code word on bus 153 is utilized by the receiver to increase, decrease, or maintain unaltered the compensation value in the receiving encoder. In the present embodiment, a logical "1" in both digital bit positions of the code word on bus 153 indicates that an increase is desired. A logical "1" in the sign bit position with a logical "0" from the output of threshold detector 207 indicates that the value should remain unaltered and, finally, a logical "0" in the sign bit position with a logical "1" from the output of threshold detector 207 indicates that the compensation value should be decreased.

Figure 3:
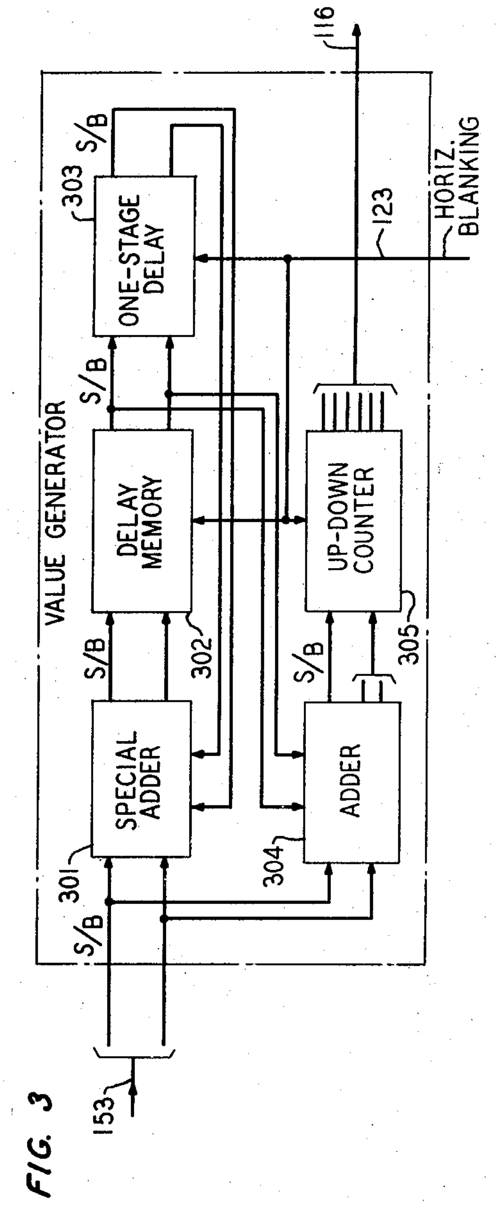
Figures 4, 5:
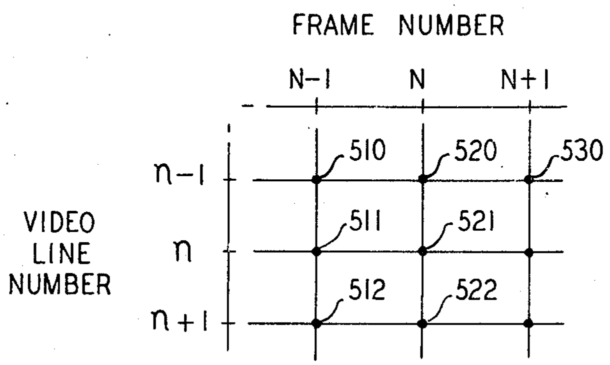
FIG. 4 is a truth table which explains the operational characteristic of a special adder circuit utilized in the apparatus of FIG. 3.
FIG. 5 is a graph of video lines versus video frames useful in explaining the operation of the present invention.

As pointed out hereinabove, this two-bit digital code word on bus 153 is developed solely in response to the frame-to-frame differences of the nonmoving picture elements in a video line. It is then utilized to change the compensation value for the next video line. In order to account for the situations in which the level changes produce different frame-to-frame differences over different portions of the scene being viewed, the compensation value developed in the present embodiment is caused to be dependent not only on the previous digital words present on bus 153 in the current frame but also on the type of change which occured during the same line interval in previous video frames. The value generator 152 utilized in the present embodiment to produce the compensation value on bus 116 is shown in a detailed schematic block diagram in FIG. 3.

in FIG. 3, the two-bit digital code word on bus 153 is coupled to one input of a special adder circuit 301. The characteristics of adder circuit 301 are shown in FIG. 4, wherein the sign bit is represented by its plus or minus equivalence rather than the actual logical state. With a value as designated in column $I_1$ of FIG. 4 at one input of special adder circuit 301 and a value as designated in column $I_2$ of FIG. 4 at the other input of adder circuit 301, a digital word having the value shown in the column designated as OUT in FIG. 4 is coupled to the input of delay memory 302. Briefly, special adder circuit 301 provides a value of zero at its output either when both of its inputs are presented with a value of zero or when one of the inputs is presented with a "−1" and the other is presented with a "+1". In all other cases, a value of "+1" or "−1" coupled to either one of the inputs results in producing a two-bit digital word equivalent to the "+1" or "−1" at the output of adder circuit 301. To aid in describing the operation of value generator 152, the output of adder circuit 301 is a modified code word, designated hereinafter as a K factor.

As will be apparent hereinafter, the K factor for each video line is in essence a record of change which has taken place in that video line. The K factor developed for any given video line during a first frame interval is utilized during the next frame interval in two ways: first, it is combined with the two-bit digital word from the previous line to produce a compensation value for the given line; and, second, it is combined with the two-bit digital word from the given line to form a new K factor for that line.

The K factor present at the output of special adder circuit 301 appears at the output of delay memory 302 after a delay interval equal to one video frame interval minus one video line interval. Delay memory 302 is constructed of two shift registers each having a plurality of cells equal in number to the number of video lines present in the delay interval provided by memory 302. The digital bits stored in these shift registers are shifted one cell toward the output of memory 302 during each horizontal blanking interval by the energizing pulse on line 123. The K factor present at the output of delay memory 302 is coupled both to the second input of an adder circuit 304 and to the input of a one-stage-delay memory 303.

Delay memory 303 is constructed of two flip-flops, one for each of the digital bits present in the two-bit K factor. A new word is read into one-stage-delay memory 303 each time that an energizing pulse is presented on line 123. The word stored in delay memory 303 is coupled back to the second input of special adder circuit 301. Adder circuit 304 develops a sum of the two-bit digital word present on bus 153 and the two-bit K factor present at the output of delay memory 302. This sum is then coupled to the input of an up-down counter 305, the output of which provides the digital word on bus 116 utilized to compensate the amplitudes stored in frame memory 112.

The operation of value generator 152 can be better understood by referring to FIG. 5 in which a graph of video lines versus frame intervals is shown. Each column of dots in FIG. 5 represents video lines in a single video frame. For example, the dot designated as 510 represents a video line arbitrarily designated as *n*-1 in a frame interval arbitrarily designated as frame interval N-1. Dot 511 represents the next video line in the same video frame, and dot 520 represents the same video line in the next video frame. In a situation where the digital word present on bus 153 has been developed in response to the frame-to-frame differences during video line 520, the K factor present at the second input of adder circuit 304 is the K factor which was developed at the termination of video line 511. It is therefore this K factor from line 511 and the two-bit digital word on bus 153 from line 520 that causes the development of a new compensation value on bus 116 to be used in the compensation of the stored picture element amplitudes corresponding to video line 521. In this way, the compensation value for a video line is caused to be dependent not only on changes that have occurred during the present frame interval but also on changes that have occurred in the same video line during previous frame intervals.

The K factor that is developed by special adder circuit 301 at the termination of line 520 is a function of the two-bit digital word developed on bus 153 from the frame-to-frame differences during ine 520 and the K factor which was developed at the termination of line 510. This K factor developed at the termination of line 520 will appear at the output of delay memory 302 and will be utilized in the development of the compensation value for line 530. In addition, this K factor developed at the termination of line 520 will be utilized by special adder circuit 301 with the two-bit digital word developed on bus 153 at the termination of line 530 in the development of a new K factor at the output of special adder circuit 301. As a result, the compensation value utilized during any given video line depends on the two-bit digital word developed on bus 153 for the frame-to-frame differences during the previous video line and on the K factor developed by the same video line during the previous frame interval.

Apparatus identical to the low-frequency compensator 150 described hereinabove is utilized in the receiving decoder to develop a compensation value for the equivalent picture elements stored in the receiving frame memory. Each two-bit digital word from bus 153 when received in the decoder is coupled to the input of the receiving integrator and threshold detector. As a result, the digital word developed by the receiving value generator is caused to be identical to the value developed in the transmitting encoder, and both the transmitting and receiving frame memories have their picture elements modified by identical values. If transmission errors are determined to present a problem in the accuracy of the transmitted digital bits, the receiving value generator can be synchronized to value generator 152 by transmitting the value at the output of generator 152 during each vertical blanking interval and by utilizing this value in the receiving decoder to set the receiving value generator to the identical value.

What has been described hereinabove is an illustrative embodiment of the present invention. Numerous modifications may be made thereto by those skilled in the art without detracting from the spirit and scope of the present invention.

We claim:

1. A redundancy reduction encoder for use with input samples having frame intervals, said encoder comprising memory means for storing an entire frame interval of samples, means for developing a difference between an input sample and a sample from said memory means, means responsive to said difference developing means for generating a control signal which indicates when said input sample is selected for transmission, means for coupling information related to said input sample to a transmission channel in response to said control signal, wherein the improvement comprises a gating means responsive to said control signal for selectively coupling to its output each difference resulting from an input sample that is not selected, means responsive to the output of said gating means for generating a compensation value, and means responsive to said compensation value for changing the amplitude of samples stored in said memory means.

2. A redundancy reduction encoder as defined in claim 1 wherein said means for generating a compensation value includes means for generating a code word to indicate whether said compensation value should be increased or decreased, and a means responsive to said code word for developing said compensation value.

3. A redundancy reduction encoder as defined in claim 2 wherein said means for generating a code word includes an integrator means for algebraically summing differences appearing at the output of said gating means for a predetermined interval.

4. A redundancy reduction encoder as defined in claim 3 wherein said means for generating a code word further includes a threshold detector means coupled to the output of said integrator means.

5. A redundancy reduction encoder as defined in claim 4 wherein said means for generating a code word further includes means for generating a count of the number of differences at the output of said gating means in said predetermined interval, and means for coupling the count to an input of said threshold detector means.

6. A redundancy reduction encoder as defined in claim 2 wherein said means responsive to said code word for developing a compensation value includes means for developing a modified code word in response to both said code word and a previously stored modified code word, memory means for storing a modified code word for at least a frame interval, and means for coupling a modified code word from said memory means to said means for developing a modified code word.

7. A redundancy reduction encoder as defined in claim 6 wherein said means for developing a compensation value further includes a two-input adder means having one input coupled to receive said code word and a second input coupled to receive a modified code word from said memory means for storing a modified code word, and an up-down counter means coupled to respond to a summation developed by said two-input adder circuit.

8. A redundancy reduction video encoder for use with input video signal samples having frame intervals, said encoder comprising a memory means for storing at least a frame interval of samples, means for developing a difference between an input sample and its corresponding sample from said memory means, means responsive to said difference for generating a control signal to indicate that said input sample has been selected for transmission, gating means responsive to said developed difference and said control signal for selectively coupling to its output developed differences which result from input samples that are not selected, and means responsive to the developed differences at the output of said gating means for modifying samples stored in said memory means.

9. A redundancy reduction video encoder as defined in claim 8 wherein said means for modifying samples stored in said memory means includes means for generating a compensation value in response to the developed differences at the output of said gating means, a summation means having two inputs and an output, means for coupling one of said two inputs to receive previously stored samples from said memory means, means for coupling said output to said means for developing a difference, and means for coupling the compensation value to the other of said two inputs.

10. A redundancy reduction encoder as defined in claim 9 wherein said means for generating the compensation value includes means for generating a code word to indicate whether said compensation value should be increased or decreased, and means responsive to said code word for developing said compensation value.

11. A redundancy reduction encoder as defined in claim 10 wherein said means for generating a code word includes an intergrator means for algebraically summing the developed differences at the output of said gating means for a predetermined interval.

12. A redundancy reduction encoder as defined in claim 11 wherein said means for generating a code word further includes a threshold detector means coupled to respond to the algebraic summation developed by said integrator means.

13. A redundancy reduction encoder as defined in claim 12 wherein said means for generating a code word further includes means for generating a count of the number of developed differences at the output of said gating means in said predetermined interval, and means for coupling the count to an input of said threshold detector means.

14. A redundancy reduction encoder as defined in claim 10 wherein said means responsive to said code word for developing a compensation value includes means for developing a modified code word in response to said code word and a previously stored modified code word, memory means for storing a modified code word for at least a frame interval, and means for coupling a modified code word from said memory means to said means for developing a modified code word.

15. A redundancy reduction encoder as defined in claim 14 wherein said means for developing a compensation value further includes a two-input adder means having one input coupled to receive said code word and a second input coupled to receive a modified code word from said memory means for storing a modified code word, and an up-down counter means coupled to respond to a summation developed by said two-input adder circuit.

* * * * *